(12) United States Patent
Xu et al.

(10) Patent No.: US 10,051,216 B2
(45) Date of Patent: Aug. 14, 2018

(54) IMAGING APPARATUS AND IMAGING METHOD THEREOF USING CORRELATED DOUBLE SAMPLING

(71) Applicant: SmartSens Technology (US) Inc., Santa Clara, CA (US)

(72) Inventors: Chen Xu, Santa Clara, CA (US); Zexu Shao, Shanghai (CN)

(73) Assignee: SmartSens Technology (US) Inc., Santa Clara, CA (US)

( * ) Notice: Subject to any disclaimer, the term of this patent is extended or adjusted under 35 U.S.C. 154(b) by 0 days.

(21) Appl. No.: 15/335,690

(22) Filed: Oct. 27, 2016

(65) Prior Publication Data

US 2017/0078598 A1 Mar. 16, 2017

(30) Foreign Application Priority Data

May 11, 2016 (CN) .......................... 2016 1 0310695

(51) Int. Cl.
*H04N 3/14* (2006.01)
*H04N 5/335* (2011.01)
*H04N 5/357* (2011.01)
*H04N 5/355* (2011.01)

(52) U.S. Cl.
CPC ......... *H04N 5/3575* (2013.01); *H04N 5/3559* (2013.01)

(58) Field of Classification Search
CPC .......................... H04N 5/3575; H04N 5/3559
USPC ........ 348/294–324; 250/208.1; 257/290–292
See application file for complete search history.

(56) References Cited

U.S. PATENT DOCUMENTS

2010/0188543 A1\* 7/2010 Oike ................. H01L 27/14609
  348/308
2017/0142355 A1\* 5/2017 Deng ................... H04N 5/3532

\* cited by examiner

*Primary Examiner* — Yogesh Aggarwal
(74) *Attorney, Agent, or Firm* — Guosheng Wang; United States Research and Patent Firm (57) ABSTRACT

The present invention relates to an imaging apparatus, including a pixel array comprising a plurality of pixels arranged in rows and columns, wherein at least one of the pixels comprises a capacitor configured to store a reset signal and a pixel signal; and a plurality of column circuits, wherein at least one of the column circuits reads the reset signal and the pixel signal from the capacitor respectively, and generates the difference between the reset signal and the pixel signal, the generation of the pixel signal being later than that of the reset signal.

7 Claims, 11 Drawing Sheets

IMAGING APPARATUS AND IMAGING METHOD THEREOF USING CORRELATED DOUBLE SAMPLING

CROSS-REFERENCE TO RELATED U.S. APPLICATIONS

This application claims benefit of priority under the Paris Convention based on Chinese Application No. 201610310695.2 filed on May 11, 2016, the entire disclosures of which is incorporated herein by reference.

STATEMENT REGARDING FEDERALLY SPONSORED RESEARCH OR DEVELOPMENT

Not applicable.

NAMES OF PARTIES TO A JOINT RESEARCH AGREEMENT

Not applicable.

REFERENCE TO AN APPENDIX SUBMITTED ON COMPACT DISC

Not applicable.

FIELD OF THE INVENTION

The present invention relates to a field of imaging technology, and particularly to an imaging apparatus and an imaging method thereof.

BACKGROUND OF THE INVENTION

CMOS image sensors have been widely used in various products such as cell phones, tablet computers, security monitoring systems and the like. In many applications such as industrial camera, machine vision and the like, the sensor needs to capture the objects moving at high speed without distortion caused by the high speed motion of the object and the requirements of image recognition algorithm. Traditional CMOS image sensors with rolling shutter, which read progressively, can generate Jell-O effect on objects moving at high speed and the image may be distorted, and therefore, it is required to use a global shutter.

In the existing image sensors with a global shutter, however, the two read-outs of the image signal and the reset signal are not correlated in a full sense in which the signal is read out before the signal is reset, and thus the noise in the signal cannot be entirely eliminated, which leads to decreased SNR of image. Currently, there is no solution available to address this technical problem.

Advantageously, the present invention provides a solution that can solve this problem.

SUMMARY OF THE INVENTION

One aspect of the present invention provides an imaging apparatus. The apparatus comprises a pixel array comprising a plurality of pixels arranged in rows and columns, wherein at least one of the pixels comprises a capacitor configured to store a reset signal and a pixel signal; and a plurality of column circuits, wherein at least one of the column circuits reads the reset signal and the pixel signal respectively from the capacitor, and generates the difference between the reset signal and the pixel signal, the generation of the pixel signal being later than that of the reset signal.

In the aforementioned imaging apparatus, the pixel further comprises: an output transistor connected between an output transistor of the pixel and the ground; an output source follower transistor connected to an output of a first capacitor and a second capacitor and a row selection transistor.

In the aforementioned imaging apparatus, the pixel further comprises a switch connected between an output of the source follower transistor and the capacitor.

In the aforementioned imaging apparatus, the pixel further comprises a global shutter transistor connected between a photodiode and a voltage source.

In the aforementioned imaging apparatus, the pixel array comprises a first group of pixels corresponding to a first transfer voltage, and a second group of pixels corresponding to a second transfer voltage, the first transfer voltage being higher than the second transfer voltage.

In the aforementioned imaging apparatus, the first transfer voltage corresponds to a first exposure time and the second transfer voltage corresponds to a second exposure time, the first exposure time being lower than the second exposure time.

In the aforementioned imaging apparatus, the first exposure time and the second exposure time satisfy the following formula:

$$t1 = tint - t2$$

$$t2 = tint \times (\tfrac{1}{2})^a$$

where t1 represents the first exposure time, t2 represents the second exposure time, tint represents an automatic exposure time, and a represents a positive integer.

Another aspect of the invention provides an imaging method, which, with respect to at least one of pixels in a pixel array arranged in rows and columns, comprises: resetting a storage area, generating a reset signal, and storing the reset signal to a storage element; reading out the reset signal stored in the storage element; transferring a pixel signal in a photodiode to the storage area, generating a pixel signal, and storing the pixel signal to the storage element; reading out the pixel signal stored in the storage element; and obtaining the difference between the reset signal and the pixel signal.

In the aforementioned imaging method, the storage element refers to a capacitor.

In the aforementioned imaging method, a switch is included between the pixel and the capacitor, and the switch is in off state when the reset signal or the pixel signal is read out.

The above features and advantages and other features and advantages of the present invention are readily apparent from the following detailed description of the best modes for carrying out the invention when taken in connection with the accompanying drawings.

BRIEF DESCRIPTION OF THE SEVERAL VIEWS OF THE DRAWINGS

The present invention is illustrated by way of example, and not by way of limitation, in the figures of the accompanying drawings and in which like reference numerals refer to similar elements. All the figures are schematic and generally only show parts which are necessary in order to elucidate the invention. For simplicity and clarity of illustration, elements shown in the figures and discussed below have not necessarily been drawn to scale. Well-known structures and devices are shown in simplified form in order to avoid unnecessarily obscuring the present invention. Other parts may be omitted or merely suggested.

DETAILED DESCRIPTION OF THE PREFERRED EMBODIMENT

To make the objects, technical solutions and advantages of the embodiments of the present invention more clearly, the technical solutions of embodiments of the present invention will now be clearly and fully described with reference to the accompanying drawings. It is apparent, however, that only some, and not all, of the embodiments of the present invention are described. Based on the embodiments of present invention, all the other embodiments that a skilled person would arrive at without inventive efforts shall fall within the scope of protection of the present invention.

In the following detailed description, reference can be made to the accompanying drawings, which as part of the present application serve to illustrate particular embodiments of the present application. In the drawings, like reference numerals refer to generally similar elements. Various particular embodiments of the present application have been described, to such sufficient detail that a person of ordinary skill with relevant knowledge and technique in the art can practice the technical solution of the present application. It should be understood that other embodiments can be used, or that structural, logical or electrical changes can be made to the embodiments of the present application.

Figure 1:
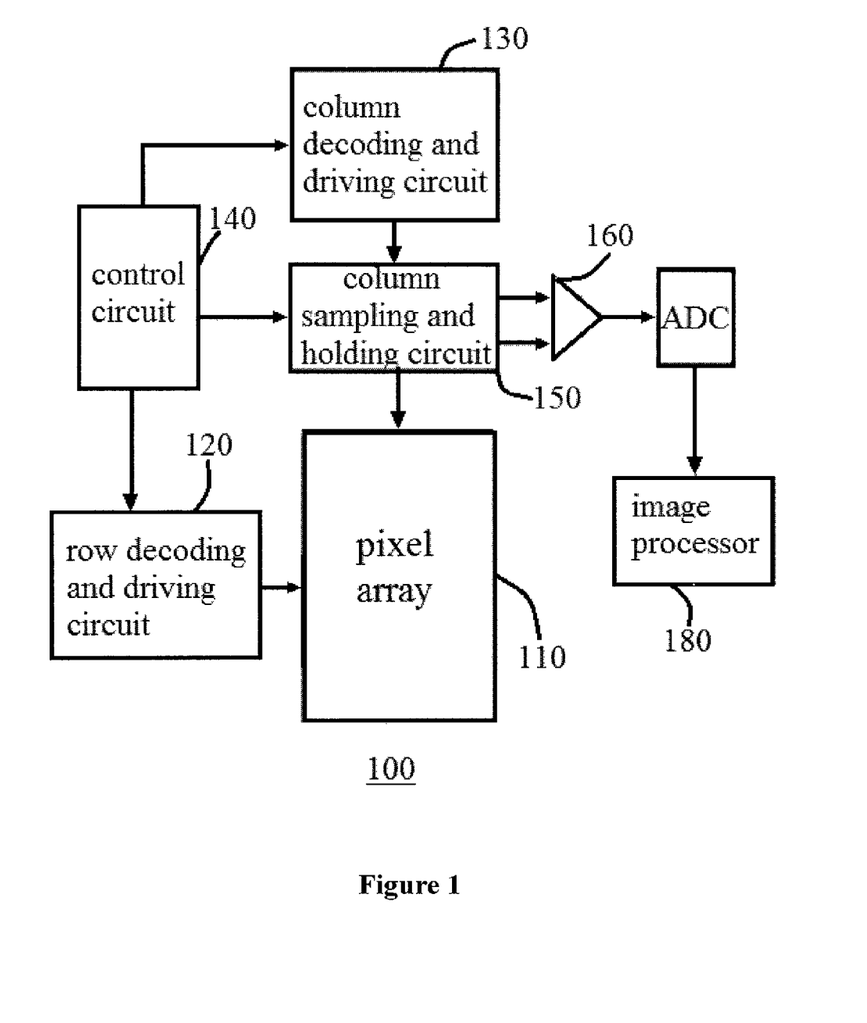
FIG. 1 shows a schematic diagram of the structure of an imaging apparatus.
Figure 2:
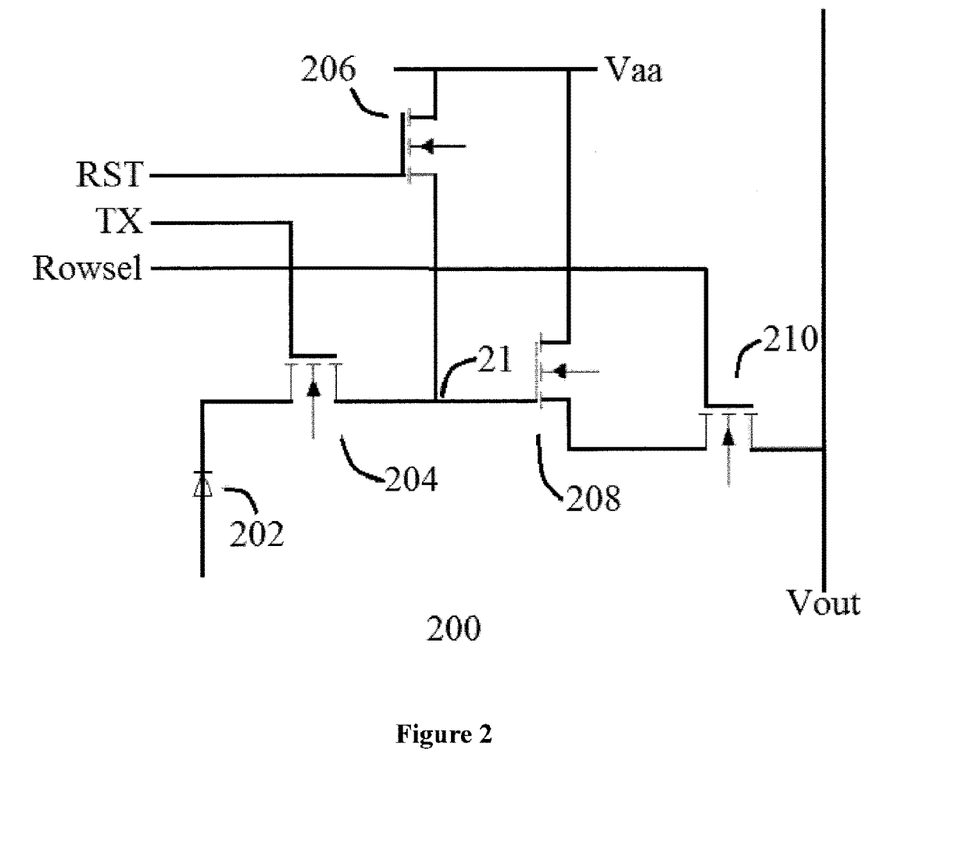
FIG. 2 schematically illustrates a representative pixel structure.

The term pixel refers to an electrical element comprising an optic sensor or other devices for converting electromagnetic signals into electric signals. For purpose of illustration, FIG. 1 illustrates a representative imaging apparatus, which includes one pixel array. FIG. 2 illustrates a representative pixel, and all pixels in a pixel array are typically fabricated in a similar way.

FIG. 1 schematically shows the structure of an imaging apparatus 100. The imaging apparatus 100 such as a CMOS imaging apparatus, comprises a pixel array 110. The pixel array 110 comprises a plurality of pixels arranged in rows and columns The pixels in each column of the pixel array 110 are gated simultaneously by a column selection line, and the pixels in each row are selectively output by a row selection line, respectively. Each of the pixels has a row address and a column address. The column address of the pixels corresponds to the column selection line driven by a column decoding and driving circuit 130, and the row address of the pixels corresponds to the row selection line driven by a row decoding and driving circuit 120. A control circuit 140 controls the column decoding and driving circuit 130 and the row decoding and driving circuit 120, so as to selectively read out the pixel output signal corresponding to a proper row or column in the pixel array.

The pixel output signal comprises a pixel reset signal $V_{rst}$ and a pixel image signal $V_{sig}$. The pixel reset signal $V_{rst}$ represents the signal obtained from a floating diffusion region when the floating diffusion region of the optic device (such as a photodiode) is reset. The pixel image signal $V_{sig}$ represents a signal obtained from the charge of the representative image obtained by the optic device transferring to the floating diffusion region. The pixel reset signal $V_{rst}$ and the pixel image signal $V_{sig}$ are both read out by the column sample and hold circuit 150, and performs subtraction through the differential amplifier 160. The signal $V_{rst}$-$V_{sig}$ outputted from the differential amplifier 160 represents the image signal obtained by the optic device. The image signal is converted into a digital signal through an AD converter ADC 170, and further processed by image processor 180 to output a digitized image.

FIG. 2 is a schematic diagram illustrating a representative pixel structure. The pixel 200 in FIG. 2 comprises a photodiode 202, a transfer transistor 204, a reset transistor 206, a source follower transistor 208 and a row selection transistor 210. The photodiode 202 is connected to the source of transfer transistor 204. The transfer transistor 204 is controlled by a signal TX. When TX controls the transfer transistor to be in an 'on' state, the charges accumulated in the photodiode are transferred to the storage area 21. Meanwhile, the photodiode 202 is reset. The gate of the source follower transistor 208 is connected to the storage area 21. The source follower transistor 208 amplifies the signal received from storage area 21. The source of the reset transistor 206 is also connected to the storage area 21. The reset transistor 206 is controlled by a signal RST for resetting the storage area 21. The pixel 200 further comprises the row selection transistor 210. The row selection transistor 210 is controlled by a signal RowSel, and outputs the signal amplified by source follower transistor 208 to an output line Vout.

Figure 3:
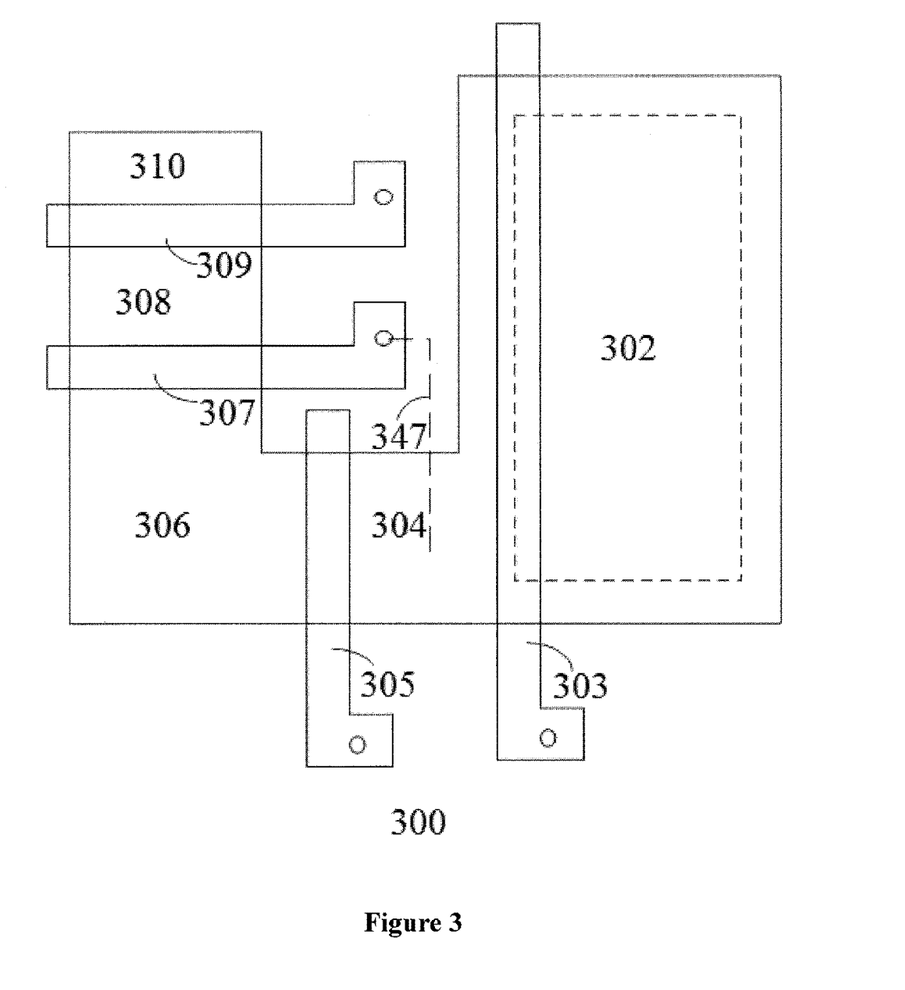
FIG. 3 illustrates another representative pixel structure.

FIG. 3 is also a schematic diagram illustrating a representative pixel structure. FIG. 3 is not a schematic diagram of abstract circuit logic relation, but a schematic diagram of specific structure of semiconductor. The pixel 300 in FIG. 3 comprises a photodiode 302 as an optic device. The pixel 300 comprises a transfer gate 303, which forms a transfer transistor with a photodiode 302 and a storage area, i.e. a floating diffusion region 304. The pixel 300 also comprises a reset gate 305, which is connected between the floating diffusion region 304 and an active area 306, for resetting the floating diffusion region 304. The active area 306 is connected to a voltage source Vaa. The pixel 300 also comprises a source follower gate 307, which is connected between the active areas 306 and 308 to form a source follower transistor, and the source follower gate 307 is electrically coupled to the floating diffusion region 304 through an electric connection 347. The pixel 300 further comprises a row selection transistor gate 309, which is connected between the active area 308 and the active area 310 as a pixel output port to form a row selection transistor.

The source area/drain area, the floating diffusion region, the channel area located at the next stage of the gate between the source/drain area of the above transistors and the photodiodes are defined as the active area due to their doping, which defines the active electric apparatus in combination with the gate structure.

In view of the problems existing in the prior arts, a circuit structure based on column parallel reading structure is provided in the present invention.

Figure 4:
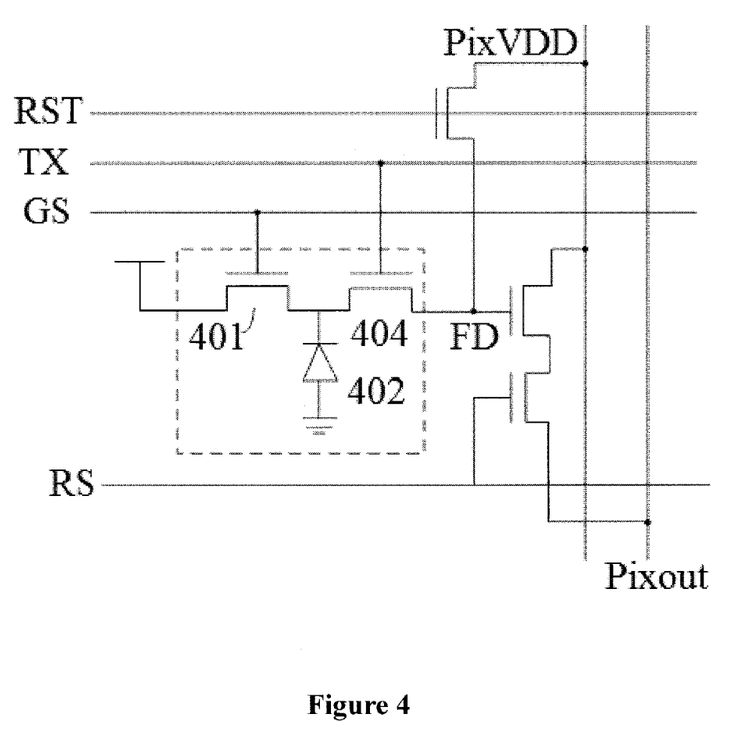
FIG. 4 is a schematic diagram of a pixel structure of an image sensor with global shutter in prior art.
Figure 5:
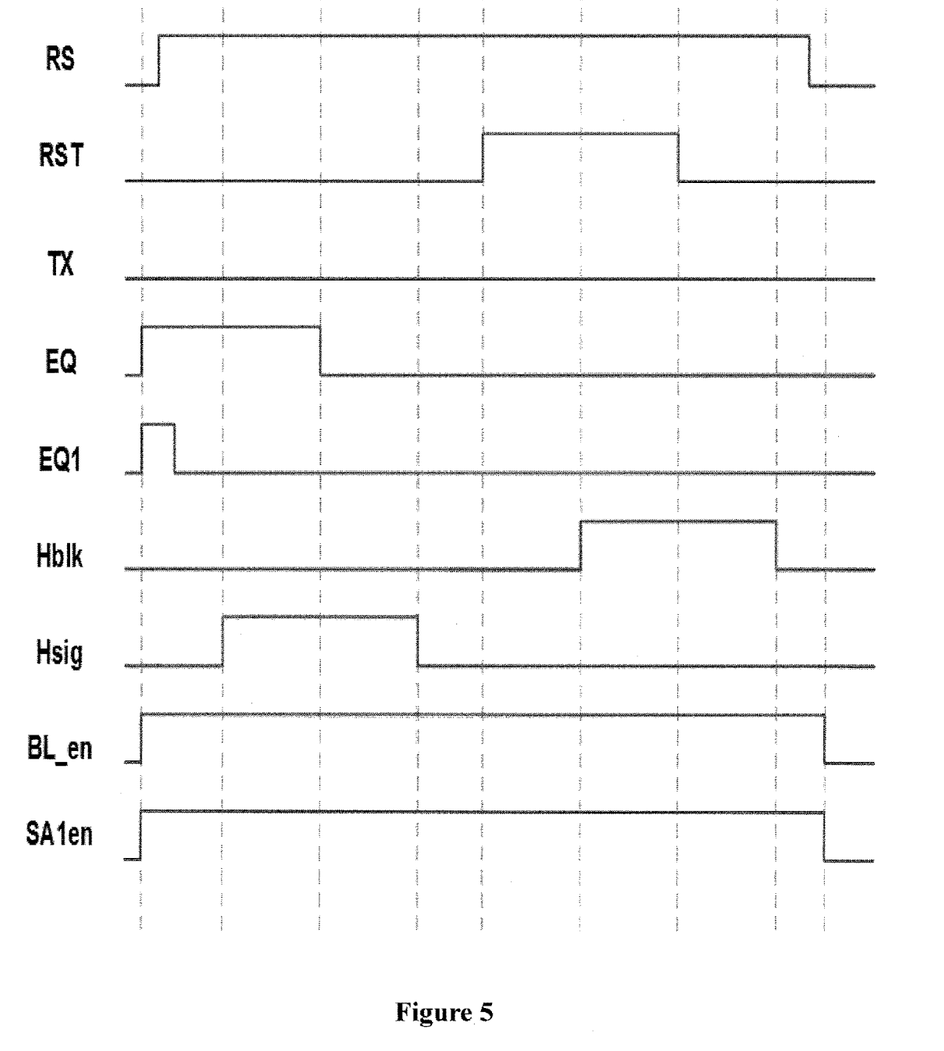
FIG. 5 illustrates a timing chart of signal read-out of the image sensor with global shutter in prior art.

FIG. 4 is a schematic diagram of a pixel structure of an image sensor with global shutter in prior art. FIG. 5 is a timing chart of signal read-out of the image sensor with global shutter in prior art. With reference to FIGS. 4 and 5, on the basis of the traditional pixel structure, the global shutter transistor 401 is added to each of the pixels, which is configured to be controlled by a global shutter (GS) signal. The global shutter transistor 401 is connected to the photodiode 202, so as to control the exposure time of photodiode 402 under the control of GS signal. In the existing image sensor with global shutter, since both the pixel exposure controlled by the GS signal and the read-out controlled by the TX signal are in global mode, when the integration in timing is over (i.e. at the end of the photodiode exposure), the TX is turned on globally, and the signal is firstly stored in the capacitor of FD. With reference to FIG. 5, when the signal is read out, the row selection signal RS is turned on, the pixel signal (i.e. 'signal' signal) is firstly read out. Then the RST signal resets the voltage of FD, and after that, the reset signal (i.e. 'reset' signal) is read out. As the read-out of the pixel signal occurs before the RST signal resets the FD, the two read-outs are not correlated in the full sense. As such, the noise cannot be completely eliminated in the subsequent reverse correlating operation. Consequently, the signal-noise-ratio of the image obtained through the traditional image sensor with the global shutter is descended.

Figure 6:
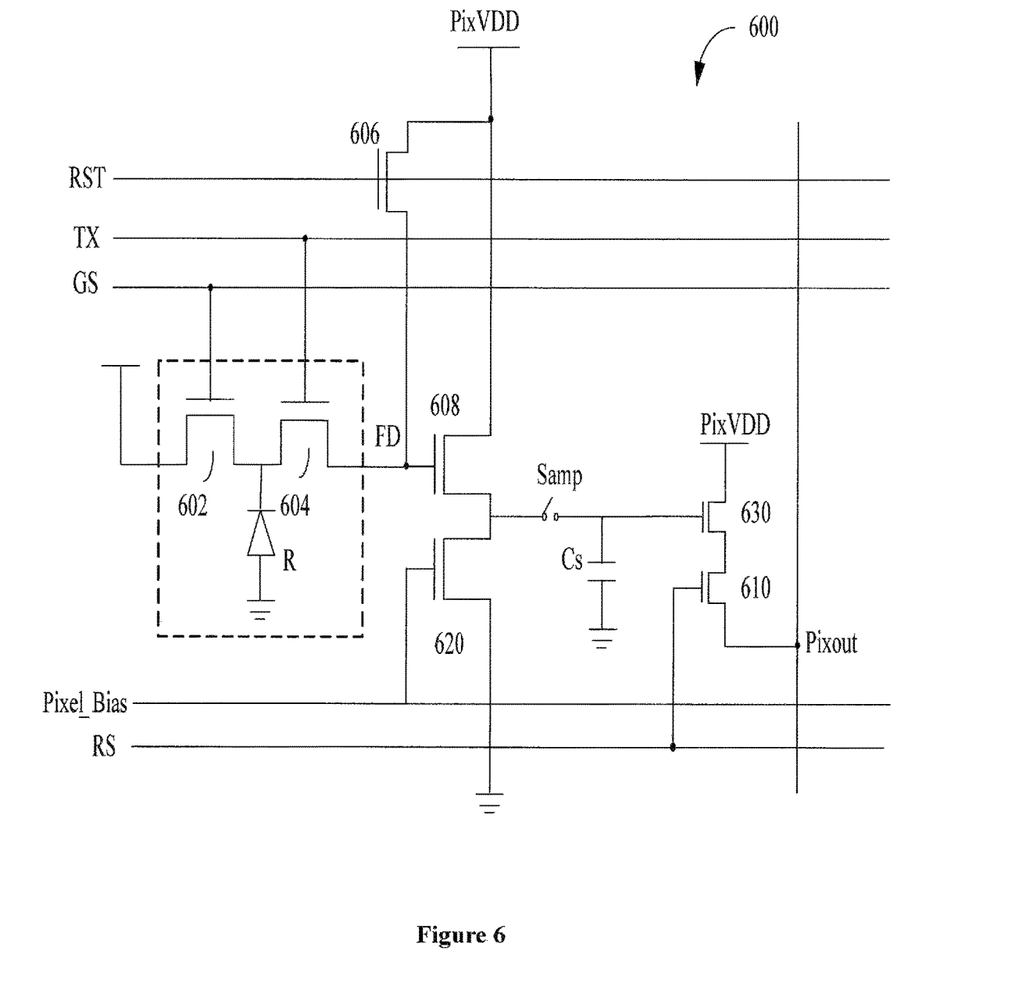
FIG. 6 shows a schematic diagram of a pixel structure in accordance with an exemplary embodiment of the present invention.

FIG. 6 is a schematic diagram of a pixel structure according to one embodiment of the present invention. The functions of the respective elements in FIG. 6 are similar to the functions of corresponding elements in FIG. 4, and their differences are specifically described as follows. As shown in FIG. 6, on the basis of existing pixel structure, a capacitor Cs for storing the 'reset' signal and the 'signal' signal is added to the pixel 600. The 'reset' and 'signal' signals will be respectively stored in the capacitor Cs at different timing, to ensure the correlation of those two signals. With a storage unit of the capacitor Cs, at the end of the global exposure, the pixel can be read at timing of a full correlation sampling. These two signals will be subtracted from each other in a subsequent column reading circuit to achieve the effect of correlated double sampling (CDS).

According to one embodiment of the present invention, the pixel 600 further comprises an output transistor 620, which is connected between a source follower transistor 608 and the ground, and controlled by a bias control signal Bias_ctrl. When the 'reset' and 'signal' signals are read out and stored to the capacitor Cs, an output transistor 620 is in turned off state to ensure the storage of the signals. After that, the output transistor 620 grounds the output of source follower transistor 608 to reduce the inference when the 'reset' and 'signal' signals are read out, and to ensure auto-zeroing.

According to one embodiment of the present invention, the pixel 600 further comprises an output source follower transistor 630, which is connected between an output of capacitor Cs and a row selection transistor 610 to form a row output circuit so as to provide an output signal. According to one embodiment of the present invention, the pixel 600 further comprises a sampling switch Samp, which is connected between the output of source follower transistor 608 and capacitor Cs.

Figure 7:
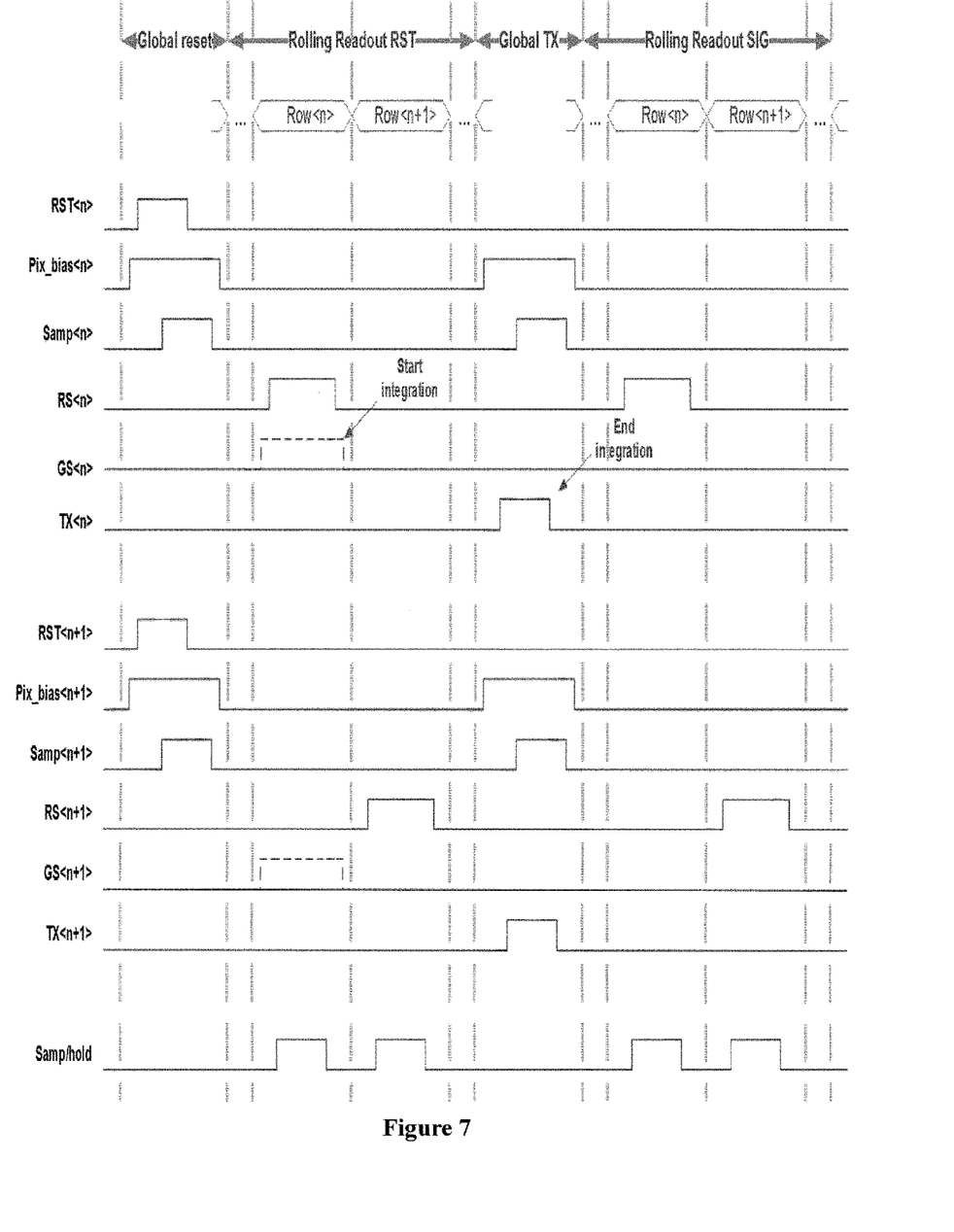
FIG. 7 is a timing chart of pixel operation in accordance with an exemplary embodiment of the present invention.

FIG. 7 is a timing chart of pixel operation according to one embodiment of the present invention. As shown in FIG. 7, the global reset is firstly performed in which a RST signal resets a signal storage area FD, a 'reset' signal passes through a pixel output transistor 620 and a sampling switch Samp to be stored in a capacitor Cs. Then at the stage of rolling reading RST, the 'reset' signal is read out progressively. It should be noted that when the 'reset' signal stored in Cs is read out progressively, the switch Samp is in off state to completely isolate the read-out of Cs from the exposure of the photodiode. At this moment, if a global exposure signal GS occurs (as shown in dash line in the FIG. 7), the charges in the photodiode start to be transferred to the FD area (the integration starts). After the 'reset' signals stored in all the Cs are progressively read out, the global charge transferring is performed (global TX) in which the global TX signal transfers a FD area and forms the 'signal' signal. The 'signal' signal passes through the pixel output transistor 620 and the sampling switch Samp to be stored in capacitor Cs as well. Next, during the rolling read TX, the 'signal' signal is read out progressively. In contrast to the prior art, the 'reset' signal and the 'signal' signal read out in the embodiment in FIG. 7 are fully correlated sampling signals. The 'reset' signal and the 'signal' signal are processed in a manner in which the fully correlated sampling signal is processed, and thus the system noise can be eliminated and images with high SNR can be obtained.

Figure 8:
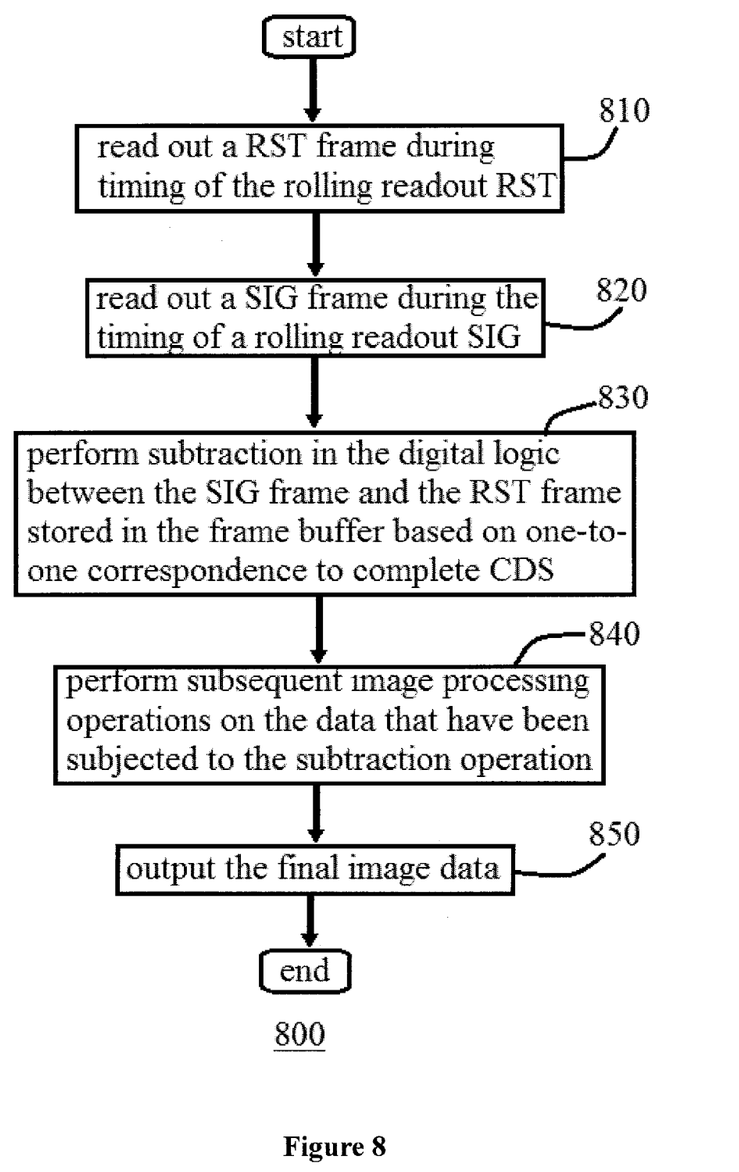
FIG. 8 shows a schematic diagram of a signal sampling method in accordance with an exemplary embodiment of the present invention.

FIG. 8 is a schematic diagram of signal sampling method according to one embodiment of the present invention. As shown in FIG. 8, the sampling method comprises the following steps. In step 810, during the rolling reading RST, a RST frame (i.e. the 'reset' signal) is read out progressively and stored in a frame buffer. In step 820, during the rolling reading TX, a SIG frame (i.e. the 'signal' signal) is progressively read out. Next, in step 830, a fully correlated double sampling signals (CDS) is processed, in which a subtraction operation is performed based on one-to-one correspondence in a digital logic circuit between the SIG frame and the RST frame stored in the frame buffer, that is, the RST frame is subtracted from the SIG frame, to obtain their difference signal. In step 840, the data resulting from the subtraction operation, i.e. the difference signal, is subjected to subsequent image processing operations such as integration, differentiation, interpolation and the like, so as to obtain the final image data. In step 850, the final image data is outputted. Since the SIG frame and the RST frame are fully correlated sampling data, it is possible to obtain the image data with high SNR by performing process in a manner in which the existing fully correlated sampling signal is processed.

According to one embodiment of the present invention, the frame buffer and the imaging apparatus can be located in a same chip, or can be located in different chips. Alternatively, it can be implemented by a computer, a cell phone AP processor, or a built-in DDR memory.

According to one embodiment of the present invention, at the time of the pixel integration, since the pixel and the capacitor are separated by the Samp switch, the pixel integration can start directly from the global shutter timing. In addition, wide dynamic function can be achieved by control of the voltage imposed on TX during the exposure period.

Figure 9:
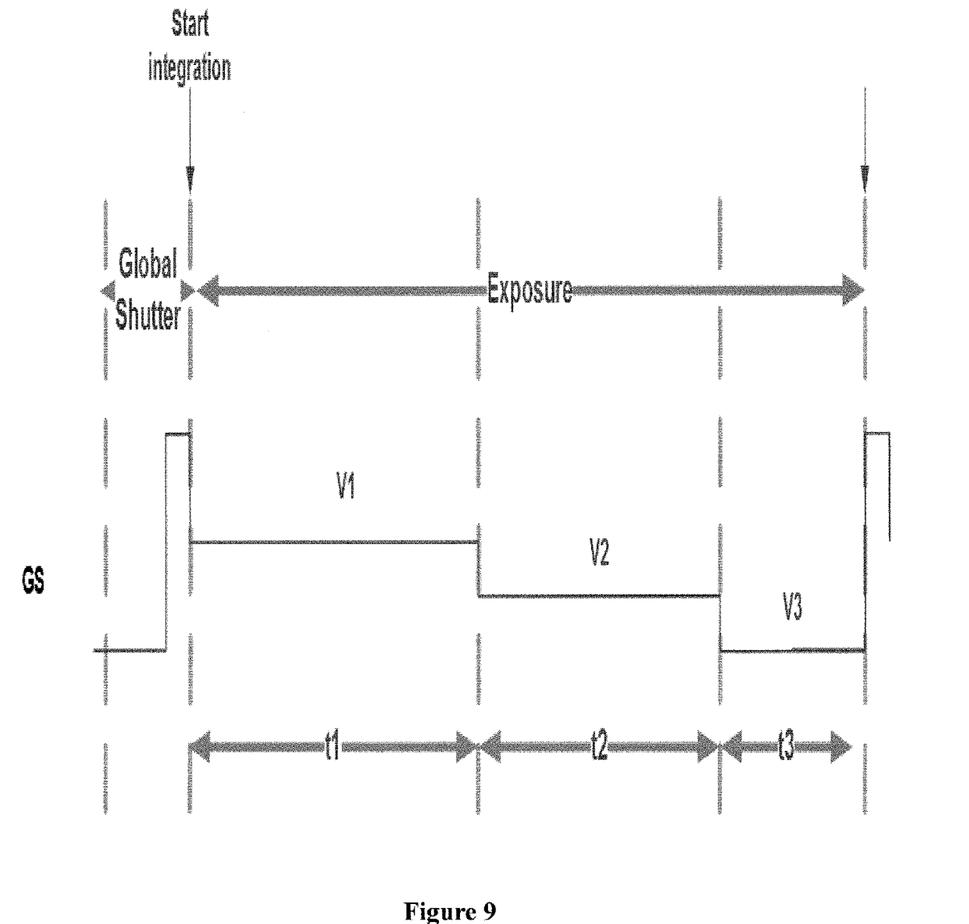
FIG. 9 shows a schematic diagram of obtaining a wide dynamic range by controlling TX voltage according to one embodiment of the present invention.
Figure 10:
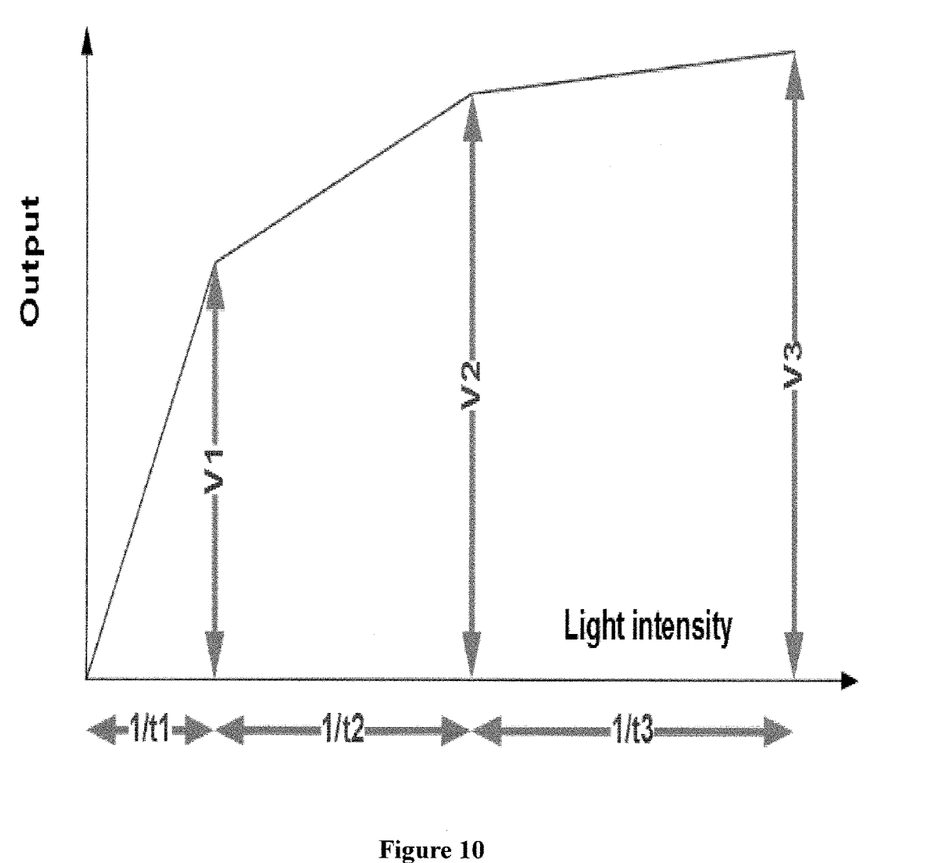
FIG. 10 depicts a schematic diagram of wide dynamic range photoelectric conversion curve of an image output when a process is performed according to the timing of the embodiment shown in FIG. 9.

FIG. 9 is a schematic diagram of obtaining wide dynamic range by controlling TX voltage according to one embodiment of the present invention. FIG. 10 is a schematic diagram of wide dynamic range photoelectric conversion curve of an image output when a process is performed according to the timing of the embodiment shown in FIG. 9.

As shown in FIG. 9 and FIG. 10, TX has different amplitude values lasting for a certain time, and the different amplitude values correspond to different groups of the pixels in the image sensor, respectively, such that the different groups of the pixels in the image sensor transfer charges to FD at different timing, which are further stored in Cs. As such, the different groups of the pixels in the image sensor have different exposure times. As shown in FIG. 12, the exposure time of the group of the pixels for transferring voltage V1 is t1, the exposure time of the group of the pixels for transferring voltage V2 is t1+t2, and the exposure time of the group of the pixels for transferring voltage V3 is t1+t2+t3. Since the saturations of the photodiodes corresponding to different exposure times are different, the obtained image can have a wider dynamic range.

It can be seen from the photoelectric response curve shown in FIG. 10 that as the light intensity increases, the response curve of the pixel shows a non-linear characteristic. Thus, the pixel can maintain the image detail with low illumination levels, and can capture the image detail with higher light intensities without oversaturation. This is the mechanism by which wide dynamic range is achieved. In the curve as described above, the voltage values of V1, V2, and V3, and t1, t2, and t3 directly influence the inflection point of the curve and the characteristic of the wide dynamic range.

The light intensity can approximate the reciprocal of the exposure time. In normal use, t1 is the longest exposure time, t2 is a shorter time, and t3 is the shortest time. Therefore, the light intensity at the first slope is the shortest, i.e. provides the highest low illumination level.

The total exposure time equals to the sum of t1, t2, and t3:

$$tint = t1 + t2 + t3 \quad (1).$$

According to one embodiment of the present invention, t1, t2, and t3 are calculated according to a sequence of numbers of multiplies of 2. t1, t2, and t3 can be calculated automatically according to automatic exposure time, as specified below:

$$t1 = tint - t2 - t3 \quad (2)$$

$$t2 = tint \times (1/2)^a \quad (3)$$

$$t3 = tint \times (1/2)^b \quad (4)$$

where tint is the automatic exposure time; a and b are parameters which can be set manually by user to determine the steps among t1, t2, and t3. For example, if a=4 and b=6, t2 will be (1/16) tint, t3 will be (1/64) tint, t1=tint−t2−t3, and the like.

Figure 11:
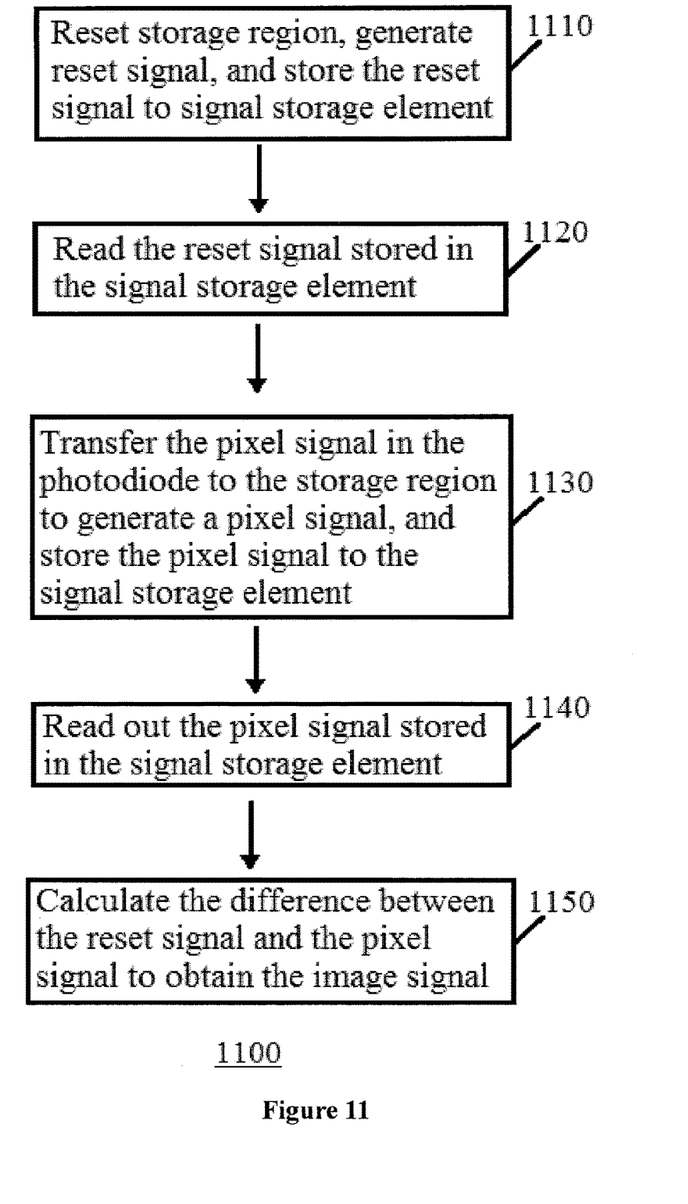
FIG. 11 shows a schematic diagram of an imaging method according to one embodiment of the present invention.

FIG. 11 is a schematic diagram of an imaging method according to one embodiment of the present invention. As shown in FIG. 11, an imaging method 1100 comprises steps of: in a pixel array arranged in rows and columns, for at least one of the pixels, at step 1110, resetting a stored area, generating a reset signal, and storing the reset signal to a signal storage element; in step 1120, reading out the reset signal stored in the signal storage element; in step 1130, transferring a pixel signal in a photodiode to the storage area, generating a pixel signal, and storing the pixel signal to the signal storage element; and in step 1140, reading out the pixel signal stored in the signal storage element; and in step 1150, calculating the difference of the reset signal and the pixel signal to obtain the image signal.

Finally, it should be explained that, the above embodiments are only used for explaining the technical solution of present invention, and not for limitation thereto. Although the present invention has been explained in details with reference to the preferred embodiments, it should be understood by those skilled in the art that modifications and equivalent alternations can be made to the technical solution of present invention, and these modifications and equivalent alternations cannot depart the modified technical solution from the spirit and scope of the technical solution of present invention.

The invention claimed is:

1. An imaging apparatus, comprising:
   a pixel array comprising a plurality of pixels arranged in rows and columns, wherein at least one of the pixels comprises a capacitor configured to store a reset signal and a pixel signal, an output transistor connected between an output transistor of the pixel and the ground, and an output source follower transistor connected to an output of a first capacitor and a second capacitor and a row selection transistor; and
   a plurality of column circuits, wherein at least one of the column circuits reads the reset signal and the pixel signal respectively from the capacitor, and generates the difference between the reset signal and the pixel signal, the generation of the pixel signal being later than that of the reset signal.

2. The apparatus according to claim 1, wherein the pixel further comprises a switch connected between an output of the source follower transistor and the capacitor.

3. The apparatus according to claim 1, wherein the pixel further comprises a global shutter transistor connected between a photodiode and a voltage source.

4. The apparatus according to claim 1, wherein the pixel array comprises a first group of pixels corresponding to a first transfer voltage, and a second group of pixels corresponding to a second transfer voltage, the first transfer voltage being higher than the second transfer voltage.

5. The apparatus according to claim 4, wherein the first transfer voltage corresponds to a first exposure time and the second transfer voltage corresponds to a second exposure time, the first exposure time being lower than the second exposure time.

6. The apparatus according to claim 5, wherein the first exposure time and the second exposure time satisfy the following formula:

$$t1 = tint - t2$$

$$t2 = tint \times (1/2)^a$$

where t1 represents the first exposure time, t2 represents the second exposure time, tint represents an automatic exposure time, and a represents a positive integer.

7. An imaging method, which, with respect to at least one of pixels in a pixel array arranged in rows and columns, comprises:
   resetting a storage area, generating a reset signal, and storing the reset signal to a capacitor;
   reading out the reset signal stored in the capacitor;
   transferring a pixel signal in a photodiode to the storage area, generating a pixel signal, and storing the pixel signal to the capacitor;
   reading out the pixel signal stored in the capacitor; and obtaining the difference between the reset signal and the pixel signal,
wherein a switch is included between the pixel and the capacitor, and the switch is in off state when the reset signal or the pixel signal is read out.

\* \* \* \* \*